Oct. 17, 1950     D. LEWIS ET AL     2,526,569
APPARATUS FOR DEMONSTRATING OR
LAYING OUT LANDSCAPE PLANS
Filed June 24, 1948                                  2 Sheets-Sheet 2
Fig. 2.
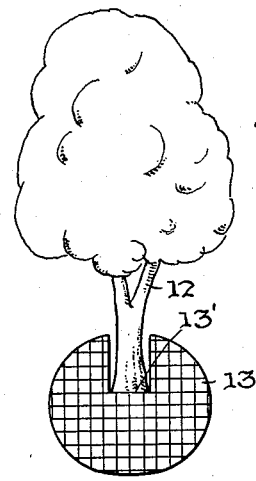
Fig. 3.
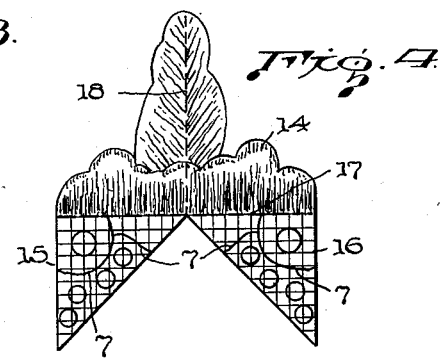
Fig. 4.
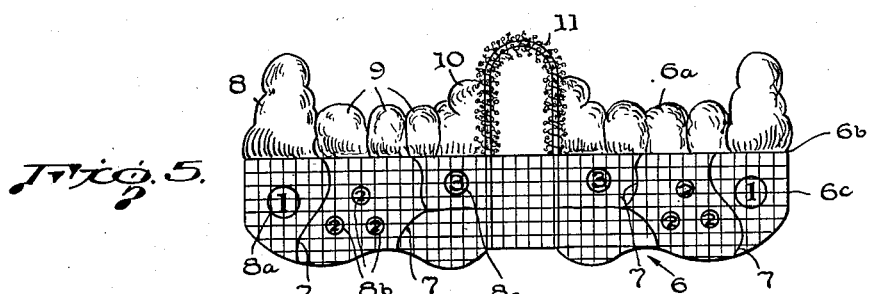
Fig. 5.
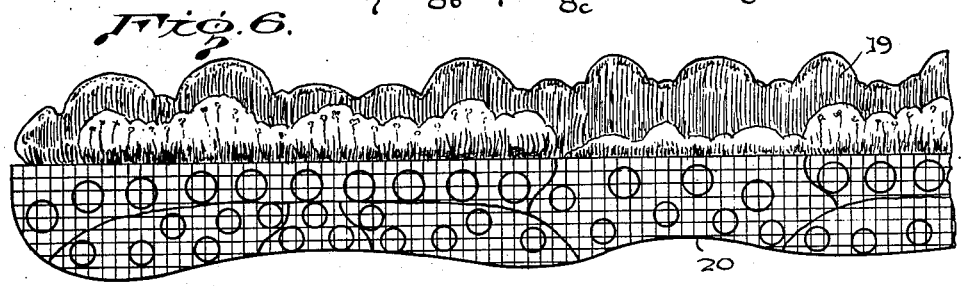
Fig. 6.
① ALTHEA
② SPIREA THUNBERGI
③ LILAC
Fig. 7.
INVENTORS
DONALD LEWIS
RUDOLPH C. MONOSMITH
BY
Robert Cobb
ATTORNEYS Patented Oct. 17, 1950

2,526,569

UNITED STATES PATENT OFFICE 2,526,569

APPARATUS FOR DEMONSTRATING OR LAYING OUT LANDSCAPE PLANS

Donald Lewis and Rudolph O. Monosmith, Louisiana, Mo., assignors to Stark Bro's Nurseries and Orchards Company, Louisiana, Mo., a corporation of Missouri Application June 24, 1948, Serial No. 34,904

3 Claims. (Cl. 35—16)

This invention relates to a system or method and apparatus for demonstrating or laying out landscape plans so as to provide a visual and accurate arrangement of buildings, and decorative plants associated, or to be associated, therewith to thereby enable a property owner to readily select and place shrubs, ornamentals, flower beds, and the like, in individual or group combinations to best advantage and appearance before or at the time of actual purchase and planting of the various plants.

Landscape artists or architects and nursery salesmen have been dealing with this problem of demonstration-landscaping by drafting of plans on flat sheets and spotting of approximate positions for pre-selected trees, shrubs and the like, but the prospective purchaser, or property owner, unless trained, has great difficulty in visualizing the esthetic effects or relationship of the individual or group collections until the various plants are actually placed, as per plot. This is all the more true, since such known plans give no idea of contour of the plants or color combination produced thereby, and so a great amount of time, labor, and costs are involved, as well as re-selections or substitutions to satisfy the customer.

It is, therefore, the primary object of this invention to facilitate landscaping by providing packagable plans which include a base or plotting sheet and printed cutouts, depicting for example, strips of hedge illustrations, border plantings, corner groups, individual ornamental trees, strubs, etc., varying in variety to any extent desired and even colored to accord with the foilage and flowers of the actual plants themselves. These cut-outs may be printed in sheet form for convenience of packaging, or they may be cut to form units at the outstart, if so desired.

The particular feature of novelty involved in these plans above referred to resides in providing the base sheet with sectional demarkations to a predetermined scale on which the cut-outs are placed, the group cut-outs having a base or support which carries its own planting arrangement plotted and scaled to correspond with the graphic demarkation of the base sheet. Thus each group and each plant of each group is accurately spotted in their prospective relationship and individual position with respect to the whole of the landscape until the complete plan satisfies the customer. The particular advantage served by these cut-out units lies in the fact that the customer can first observe the layout on the supporting section with respect to the spotted positions of the plants and then note the vertical section to obtain an idea as to the way the planting looks or will look from the colored profile.

A further objective in mind is to provide the cut-out planting arrangement with indicia more or less representative of the form or size of the plant to occupy the spotted positions, thereby serving to identify at least the position of the more prominent plants according to the size or shape of the indicia, as hereinafter more specifically explained.

Other and further objects and advantages of the invention will be hereinafter described and the novel features thereof defined in the appended claims.

In the drawings:

Figure 2 is a transverse sectional view on the line 2—2 of Figure 1;

Figure 3 is a plan view of an individual cut-out for use in connection with the plan of this invention;

Figure 4 is a similar view of a corner cut-out in profile, with triangular-shaped supporting tabs laid out flat and planting arrangement graphically indicated thereon;

Figure 5 is a flat plan view of a different grouping of plant representations in profile and arbor, such as might be desirable for an entrance planting arrangement for gardens or patios, etc.;

Figure 6 is a plan view of another unit suitable for depicting hedge or side line plantings; and Figure 7 is a key listing for use with the unit of Figure 5.

Figure 1:
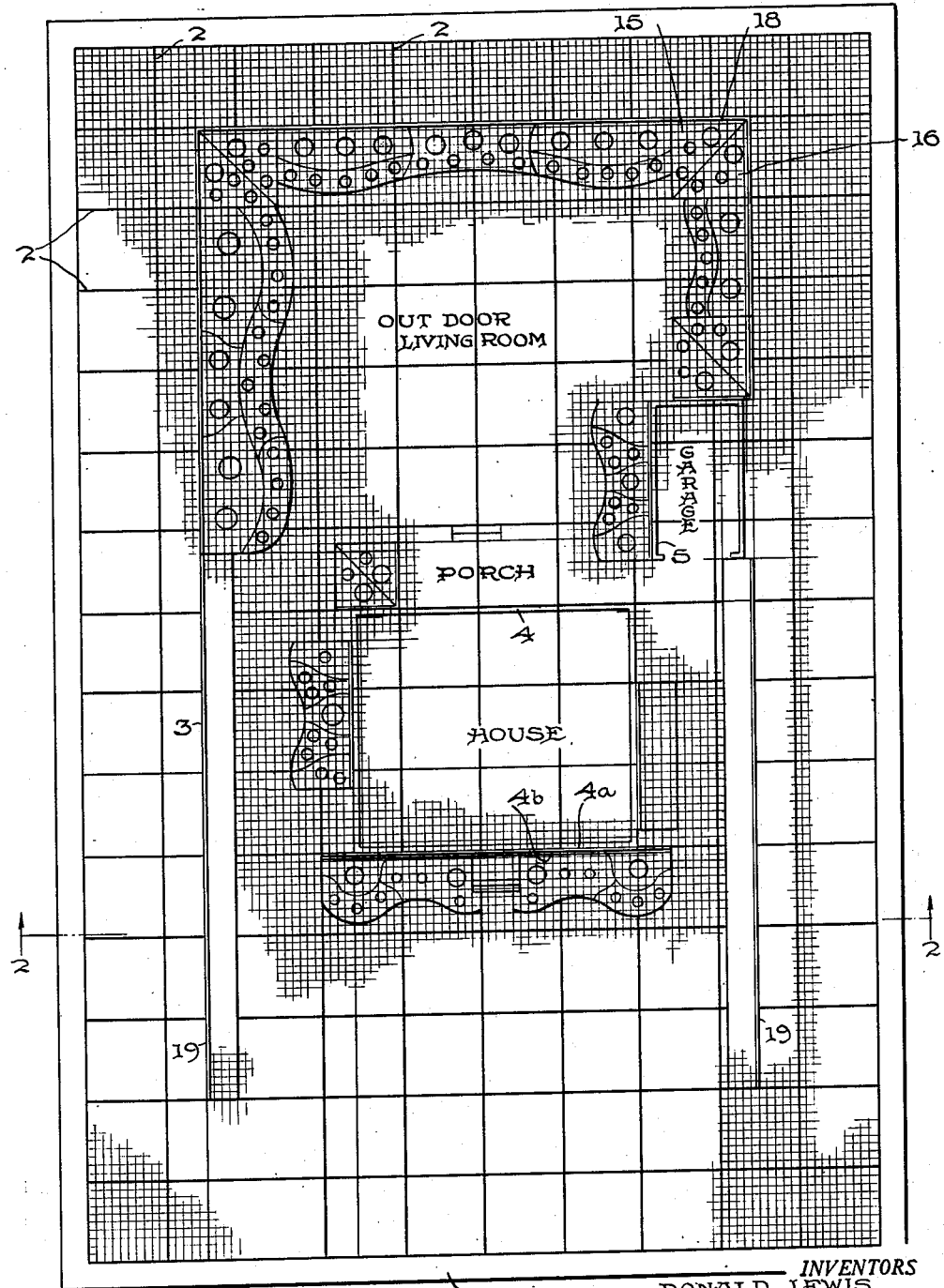
Figure 1 is a plan view of the demonstrating apparatus, showing diagrammatically the method of its use in laying out a landscape plan with elevation views of objects.

It is to be understood that the apparatus described herein may take other forms or shapes and in the use of the plans, any number of units or groups sufficient to provide variations of selections of plans to be made up in a package to facilitate handling by salesmen or others interested in planned-landscaping.

In carrying out the invention, a base sheet 1 of sufficient size is employed, this sheet having its surface ruled or printed with graph delineations to a particular scale, that illustrated as an example being of the tens scale, each tens section being heavily ruled in squares as by the lines 2. Thus, an accurately scaled plat is provided on which the landscape plan is to be worked out.

Upon this base 1, the lot lines 3 are drawn according to its shape and dimension and the outline 4 of the house is marked off likewise, including step approaches, porches, etc., if any.

The garage outline 5 and that for any other building or structure is drawn in either in simulated front elevation or diagrammatically outlined as shown in the drawings, all of these delineations constituting primary fixed objects.

In the case of the house (or other building for that matter), a photograph 4a may be taken in proper scale to that of the base sheet 1 and attached to the front unit-out, such as shown in Figures 1 and 2 of the drawings, and designated 4b as will now be more specifically set forth. A large form of one of these units is shown in Figure 5 and will be described in detail, it being understood that the component parts of these units are substantially similar except for changes in shape and additions.

Referring to Figure 5, this unit 6 is composed of the profile section of the grouping of plants (and arbor) 6a, which is bent to vertical position along the line 6b, and the base or supporting section 6c. This latter horizontal section has printed on its surface graph lines corresponding to the scale of the graph lines on the base sheet 1, and thus may be accurately placed or pasted in the proper position upon the plan base 1 with particular reference to the lot lines. In addition to the graph lines, group or section lines 7 may be employed to more readily indicate the proposed grouping arrangement of the beds and plants. Thus, it will be seen by reference to Figure 5, that the first plant or evergreen 8 on the left end is to be planted in the center of the first bed division as indicated by the circle 8a; the next profile depicts a group of smaller plants or shrubs 9, just how many and their exact position being shown by the circles 8b in the second bed division of the tab or base support 6c, and in one of the next adjacent divisions the ornamental 10 has its position indicated by the circle 8c.

The opposite end of the unit corresponds to that first described or it may differ in size or variety of planting, but always the position of the individual plant in the grouping of this unit is designated on the top of the base tab just in front of the plant profiles. In the center may be an archway 11, so that this unit would be suitable to demonstrate on the plat the entrance to a patio or garden.

Before passing from Figure 5, it will be noted that the circles 8a, 8b and 8c vary in size so as to further identify the location of a profile ornamental according to the relative sizes of these plants, so that it may be determined whether the smaller or larger plants are to be placed in front or back of each other.

Naturally, it would be somewhat difficult to determine from these profile units the particular plant variety name, but this invention contemplates the planting plan may be increased in usefulness in this particular by employing a keyed system of one sort or another, such as the notation of a key number in each circle and listing of the plants on the back of unit, as shown in Figure 7. Thus, the circle 8a contains the numeral 1. Consulting the key-list, that is an Althea; in the circles 8b occur the numerals 2, 2, 2, three plants described in list as *Spirea thunbergi*, and in circles 8c, the numeral 3, which is listed as a lilac bush, and so on.

In Figure 3 is illustrated a cut-out depicting in profile an individual plant or tree of a particular variety, designated 12, and having a bendable base support 13, this support having imprinted on its upper surface graph lines conforming to the scale of the base 1 by means of which its accurate position on the base may be determined. The shape of the support 13 may be circular to depict the bed, as shown, or of any other configuration, and it may be colored to simulate earth. By bending on the fold line 13' the base will assume a horizontal position and hold the profile in vertical position. Any number of such individual cut-outs with varying profiles may be included in a set of landscape plans so that different effects or arrangements of plantings may be demonstrated.

In carrying out this scheme, it is desirable to include other forms of cut-outs, such, for instance, as shown in Figure 4, for use in demonstrating corner group plantings and in Figure 6, side hedging or flower and ornamental combinations.

Referring to Figure 4, the profile section illustrating a suitable group planting arrangement includes a double-triangle base section composed of the wings 15, 16 with a cross fold-line 17 and a fold-line 18 at right angles thereto. To erect this cut-out for use in this plan, the unit is first folded along the line 18 and then the wings are folded on the line 17 and the inner edges of the wings are brought together in edge-to-edge relationship as shown in Figure 1, at the top corners. These wings are imprinted with a similar design of planting arrangement as has been described in connection with the cut-out units referred to above.

The side grouping cut-out of Figure 6 consists of the profile section 19, suitably illustrating back and front groupings of ornamentals and other plants with the base section showing the planting arrangement heretofore described in detail in connection with Figure 5 of the drawings. These units, as indicated, take different forms according to the position they may occupy, such as at the side of the house, along a runway to outbuildings or along the border lines of the plot. Figure 1 of the drawings shows diagrammatically the relationship of a set of the various units on the base sheet, and once a particular or satisfactory setup of these cut-out units is arrived at, the base sections of the units may be permanently or temporarily attached to the base sheet by adhesives.

By viewing the setup from the front, the complete landscaping proposed for adoption can be demonstrated and its esthetic effects determined.

The base sheet may be of paper, cardboard or other material, and the profiles may be drawn in or printed in colors or uncolored, as desired.

The individual units in any desired number of variation may be packaged in flat form for subsequent cutting to shape, or all may be imprinted upon a single sheet and subsequently cut into the individual units as shown in Figures 3 to 6, inclusive, the object being to facilitate landscape planting demonstrations, the teaching of landscape artistry and design, or even afford amusement of children in play-time.

We claim:

1. Apparatus for demonstrating landscaping plans, comprising in combination, a base sheet having delineated thereon to scale the property, buildings and other objects to be landscaped with plantings related to said objects, units separate from said base sheet, each of said units being composed of a profile section illustrative of a particular planting and a base section diagrammatically illustrative of the planting bed arrangement and including indicia indicating predetermined positions occupied by plantings represented by the profile section, said base section of the units aforesaid constituting means for attaching and supporting the units on the base sheet, and the diagrammatic illustrations of the planting bed arrangement on the base section being scaled to the scaling of the base sheet, whereby said units may be disposed in association with the buildings and objects on the base sheet for testing the appropriateness of the plantings depicted on said units.

2. Demonstrating units for use in planned landscaping apparatus, comprising a supporting base section illustrative of a planting bed and a profile section illustrative of a selective plant or plants and flexibly connected to the base section for disposition at an angle thereto, said base section having delineated thereon indicia for spotting the plant or plants represented by the profile section in predetermined positions in the planting bed.

3. Demonstrating units for use in planned landscaping apparatus, comprising a supporting base section diagrammatically illustrative of a planting bed and a profile section illustrative of a selective plant or plants and flexibly connected to the base section for disposition at a right angle thereto, said base section having delineated thereon indicia for spotting the plant or plants of the profile section in predetermined position in the planting bed, and other indicia indicative of the specie or variety of the plant or plants.

DONALD LEWIS.
RUDOLPH O. MONOSMITH.

REFERENCES CITED

The following references are of record in the file of this patent:

UNITED STATES PATENTS

| Number | Name | Date |
| --- | --- | --- |
| 397,302 | McLoughlin | Feb. 5, 1889 |
| 1,625,041 | Marshall | Apr. 19, 1927 |
| 1,736,134 | Rutherford | Nov. 19, 1929 |
| 1,845,240 | Cook | Feb. 16, 1932 |
| 1,988,461 | Reeves | Jan. 22, 1935 |
| 2,065,689 | Goethe | Dec. 29, 1936 |
| 2,127,047 | Pinney | Aug. 16, 1938 |
| 2,317,124 | Adams | Apr. 20, 1943 |
| 2,405,808 | Armbright | Aug. 13, 1946 |
| 2,408,272 | Roach | Sept. 24, 1946 |